Patented July 17, 1934

1,966,818

UNITED STATES PATENT OFFICE 1,966,818

MANUFACTURE OF SPONGY RUBBER OR SIMILAR MATERIAL

Leslie Eric Howard, Streatham Hill, London, England

No Drawing. Application July 15, 1932, Serial No. 622,823. In Great Britain July 20, 1931

4 Claims. (Cl. 18—53)

This invention relates to a process of making spongy, porous or cellular rubber or the like material from aqueous dispersions containing rubber or analogous hydrocarbons such as gutta percha and balata. The rubber or the like may be present in such aqueous dispersion in the form of the natural sap of the rubber tree or other plant, called latex, in its fresh or preserved, dilute or concentrated condition, or in a vulcanized state or as an artificial latex obtained by polymerization and dispersion of isoprene, butadiene, chloroprene or its homologues or in the form of artificial dispersions of crude, vulcanized or reclaimed rubber or the like.

So far a number of processes have become known, for producing spongy rubber directly out of rubber latex, for example by adding to the latex, well known frothing and gelling agents, or chemicals causing partial coagulation of the rubber and exhibiting a gassing reaction at elevated temperatures. These processes, however, involve the use of special machinery and require very accurate manipulation. Also the resulting product exhibits certain defects as compared with ordinary rubber sponge, which defects are closely connected with the typical structure of an unbroken latex rubber as compared with the completely broken down structure of well milled rubber as generally used for rubber sponge manufacture.

The process for making spongy rubber or the like which constitutes the present invention, consists in admixing with a concentrated aqueous dispersion containing rubber or like hydrocarbon, such as rubber latex, a volatile solvent of the hydrocarbon, such as a volatile solvent of rubber, in a quantity to cause swelling and setting of the aqueous dispersion.

Preferably the rubber latex or other aqueous dispersion is mixed with any filler, vulcanizing, accelerating, antioxidizing or colouring agent as may be required, prior to being mixed with the solvent. Such fillers or agents may however be added simultaneously with or after the solvent. Mechanical reinforcing material such as for instance animal, vegetable or mineral fibres may be incorporated in the mixture.

The admixed solvent exercises, it is believed, a trifold action. It acts as a swelling and dissolving agent on the rubber or the like whereby the nerve of the rubber is chemically broken down, thus producing a rubber of low mechanical resistance to gas formation prior to vulcanization, whereby a product of great uniformity is obtained. The solvent moreover acts as the gas forming agent because its vapour pressure, even at room temperatures, causes the formation of a multitude of gas bubbles within and swelling the mixture. Finally, the solvent acts as a setting agent.

One or more of the usual rubber solvents can be used, such as petrol, naphtha, or carbon tetrachloride. The porosity and the shape of the pores depend upon the volatility of the solvent or solvents, the amount thereof added and the temperature to which the mixture is subjected.

Examples of suitable mixtures are as follows:—

| | Parts by weight |
|---|---|
| Rubber latex of 70% rubber content | 130 |
| Sulphur | 3 |
| Zinc oxide | 3 |
| Lithopone | 15 |
| Antioxidizing agent | 2 |
| Accelerator | 1 | mixed with 5 parts of petrol.

Another typical mixture is:—

| | Parts by weight |
|---|---|
| Rubber latex of 70% rubber content | 130 |
| Sulphur | 2.5 |
| Zinc oxide | 5 |
| Antioxidizing agent | 2 |
| Accelerator | .5 |
| Mineral oil | 3 | mixed with 5 parts of petrol.

The mixture can be poured into moulds, and as its bulk increases in the course of setting it therefore espouses the configuration of the mould, and the acquired configuration can be fixed by vulcanization.

Vulcanization is preferably effected by exposing the spongy mass, in or out of the mould, in hot air.

It is preferable to stir or beat the mixture until it acquires the consistency of a stiff cream before allowing it to set and before pouring it into the mould.

If after allowing but a short time during which the solvent can act, the mixture is exposed to a temperature close to that of the boiling point of the solvent employed, a material having a new structure is obtained. Instead of having thin walled cells, the product is composed of interconnected filamentary webs extending from a plurality of nuclei, in other words the product has a more or less stereoreticulated structure. Such product is exceedingly light and of exceptional resilience.

A mould, with sheets or strings of any suitable fabric or fibrous material stretched across same, may be treated with the mixture, whereby the interstices between sheets or strings of fibrous material will become filled by the swelling of the mixture. Should rods or bars, hollow or solid, made of wood, metal or other material be used, instead of the sheets or strings as above described, such rods or bars may be removed after setting or vulcanizing of the mixture.

To allow for the subsequent swelling of the mixture, the mould is only partially filled with the mixture of latex and solvent. It has however been found that only where the mould has been initially wetted with the mixture, does the corresponding moulded portion of the moulded object acquire a continuous or unbroken skin.

Consequently, although the mould is only partially filled with the mixture steps are taken, such as by inverting or shaking the mould, to ensure that all the moulding surface of the mould is initially wetted with the mixture.

In the following claims the expression "rubber" is intended to include analogous hydrocarbons, as hereinbefore set forth.

I claim:

1. A process for the manufacture of moulded articles of spongy rubber from a concentrated aqueous dispersion containing rubber, consisting in admixing with said aqueous dispersion a volatile rubber solvent in a quantity to cause swelling and setting of said dispersion, and partially filling a mould with said mixture, and allowing said mixture to swell and set in said mould.

2. A process for the manufacture of moulded articles of spongy rubber from a concentrated aqueous dispersion containing rubber, consisting in admixing with said aqueous dispersion a vulcanizing agent and a volatile rubber solvent in a quantity to cause swelling and setting of said dispersion, partially filling a mould with said mixture, allowing said mixture to swell and set in said mould, and subjecting said mixture in said mould to a vulcanizing temperature.

3. A process for the manufacture of moulded articles of spongy rubber from a concentrated aqueous dispersion containing rubber, consisting in admixing with said aqueous dispersion a volatile rubber solvent in a quantity to cause swelling and setting of said dispersion, partially filling a mould with said mixture, wetting the entire moulding surface of said mould with said mixture, and allowing said mixture to swell and set in said mould.

4. A process for the manufacture of moulded articles of spongy rubber from a concentrated aqueous dispersion containing rubber, consisting in admixing with said aqueous dispersion a vulcanizing agent and a volatile rubber solvent in a quantity to cause swelling and setting of said dispersion, partially filling a mould with said mixture, wetting the entire moulding surface of said mould with said mixture, allowing said mixture to swell and set in said mould, and subjecting said mixture in said mould to a vulcanizing temperature.

LESLIE ERIC HOWARD.